US007269387B2

(12) United States Patent
Wolf et al.

(10) Patent No.: US 7,269,387 B2
(45) Date of Patent: Sep. 11, 2007

(54) METHOD AND APPARATUS FOR DETERMINING A DISTANCE BETWEEN A BASE STATION AND A MOBILE UNIT

(75) Inventors: Günter Lothar Wolf, Nuremberg (DE); Karl-Heinz Gabler, Erlangen (DE)

(73) Assignee: Lucent Technologies Inc., Murray Hill, NJ (US)

( * ) Notice: Subject to any disclaimer, the term of this patent is extended or adjusted under 35 U.S.C. 154(b) by 589 days.

(21) Appl. No.: 10/856,979

(22) Filed: May 28, 2004

(65) Prior Publication Data

US 2005/0266802 A1 Dec. 1, 2005

(51) Int. Cl.
*H04B 7/15* (2006.01)
(52) U.S. Cl. .............................. 455/11.1; 455/7; 455/9; 455/456.1; 455/456.5; 455/456.6; 455/404.2; 455/67.16; 342/450; 342/453
(58) Field of Classification Search .................... 455/7, 455/9, 10, 11.1, 456.1–6, 457, 67.11, 14, 455/67.16, 67.7, 404.2, 521; 342/450, 453, 342/457–458, 211, 213, 241–243, 246–249
See application file for complete search history.

(56) References Cited

U.S. PATENT DOCUMENTS 6,132,306 A * 10/2000 Trompower ................. 455/11.1
6,501,955 B1 * 12/2002 Durrant et al. ........... 455/456.1
6,633,743 B1 * 10/2003 Berlinsky ................... 455/11.1
7,013,111 B2 * 3/2006 Kuwahara et al. ......... 455/11.1

OTHER PUBLICATIONS

European International Search Report EP 05 25 2688 dated Jul. 27, 2005.

* cited by examiner

*Primary Examiner*—Matthew D. Anderson
*Assistant Examiner*—Tuan Tran

(57) ABSTRACT

The present invention provides a method and an apparatus for detecting at least one repeater between a base station and a mobile unit. The method includes determining a first estimate of a distance traveled by a signal on a wireless communication link between the base station and the mobile unit, determining a second estimate of the distance traveled by the signal on the wireless communication link between the base station and the mobile unit, and comparing the first and second estimates. The method also includes determining whether the signal was processed by the at least one repeater based upon comparing the first and second estimates.

20 Claims, 2 Drawing Sheets

METHOD AND APPARATUS FOR DETERMINING A DISTANCE BETWEEN A BASE STATION AND A MOBILE UNIT

BACKGROUND OF THE INVENTION

1. Field of the Invention

This invention relates generally to a telecommunication system, and, more particularly, to a wireless telecommunication system.

2. Description of the Related Art

Wireless telecommunication systems, such as cellular telephone systems, typically include one or more base stations that establish concurrent communication links with a plurality of mobile units. The range of a wireless communication link is limited by the transmission power of the base station and mobile units, the sensitivity of receivers in the base stations and mobile units, obstacles between the base station and mobile units, and the like. For example, if the wireless communication link is formed in free space, the power received at the mobile unit is approximately proportional to the power transmitted by the base station divided by the square of the distance from the base station to the mobile unit. For another example, the range of a base station located in a mountainous region may be substantially smaller than the range of the same base station deployed in a region that has very few physical obstacles. Obstacles such as buildings and mountains may also introduce a directional dependence into the relation between the transmitted and received power.

When the received power falls below a certain level, the mobile unit and the base station may be unable to form or maintain a wireless communication link. Thus, a relatively large number of base stations may be needed to provide complete coverage and uninterrupted service to users traveling through regions with large numbers of obstacles, such as mountainous regions and urban canyons. In addition to transmitting and receiving signals from the mobile units, a radio access network (RAN) associated with the base station may also perform other functions, such as coordinating hand-offs of moving mobile units with other base stations, maintaining lists of active mobile units associated with the base station, determining locations of the mobile units, and the like. These functions typically require additional hardware and/or software that increase the cost of deploying, maintaining, and operating the base station. Consequently, the cost of providing the large number of base stations that may be necessary to ensure complete coverage in regions having a large number of obstacles may be prohibitive. In particular, it may not be cost effective to provide a large number of base stations in a mountainous region having a low population density.

One conventional solution to this problem is to employ one or more repeaters associated with one or more of the base stations. The repeaters receive signals transmitted by the base station, amplify the power of the signal, and transmit the amplified base station signal to one or more mobile units that may be in a region beyond the range of the un-amplified base station signal. The repeaters may also receive signals transmitted by the mobile unit, amplify the power of the mobile unit signal, and transmit the amplified mobile unit signal to the base station. However, repeaters typically do not perform many of the other functions of a base station. Consequently, repeaters may be used to extend coverage area of the base station at a much lower cost than would be incurred by installing additional base stations. The additional coverage area provided by the repeater is often referred to as a repeater cell.

Repeaters also introduce time delays into the signals. For example, due to the close proximity of the receive antenna and the transmit antenna in a repeater, repeaters often have to remove and/or cancel the repeater transmit signal from the received signal to avoid or reduce feedback interference. Canceling the transmit signal is done using digital signal processing, which introduces a time delay between the received signals and the signals transmitted by the repeater.

Conventional radio access networks associated with conventional base stations are typically unable to determine whether a received signal passed through a repeater. The digital signal processing performed by the repeater is transparent to the wireless communication system. Thus, the radio access network is not able to distinguish between propagation-related time delays and time delays introduced by signal processing. And even if the time delay associated with the digital signal processing by the repeater is detected by the radio access network, the radio access network will interpret the delayed signal as multipath reception with the strongest path not being the direct path from the base station to the mobile unit. The conventional radio access network is also unable to detect the signal amplification provided by the repeater.

Consequently, the time delay and/or the signal amplification provided by the repeater may reduce the accuracy of location services provided by the conventional radio access network. For example, the radio access network may estimate the distance to the mobile unit using the round-trip time delay of a signal. However, conventional radio access networks overestimate the distance to the mobile unit when a repeater has processed the signal because the conventional radio access network is not able to compensate for the additional time delay introduced by the repeater. For another example, the radio access network may attempt to measure the distance to the mobile unit by comparing the transmitted power with the received power and applying an appropriate channel model for the wireless communication link. However, conventional radio access networks applying the channel modeling technique will underestimate the distance to the mobile unit because the conventional radio access network is not able to compensate for the power amplification introduced by the repeater.

The present invention is directed to addressing the effects of one or more of the problems set forth above.

SUMMARY OF THE INVENTION

In one embodiment of the instant invention, a method is provided for detecting at least one repeater between a base station and a mobile unit. The method includes determining a first estimate of a distance traveled by a signal on a wireless communication link between the base station and the mobile unit, determining a second estimate of the distance traveled by the signal on the wireless communication link between the base station and the mobile unit, and comparing the first and second estimates. The method also includes determining whether the signal was processed by the at least one repeater based upon comparing the first and second estimates. In another embodiment of the present invention, an apparatus is provided for implementing the method.

BRIEF DESCRIPTION OF THE DRAWINGS

The invention may be understood by reference to the following description taken in conjunction with the accompanying drawings, in which like reference numerals identify like elements, and in which.

Figure 1:
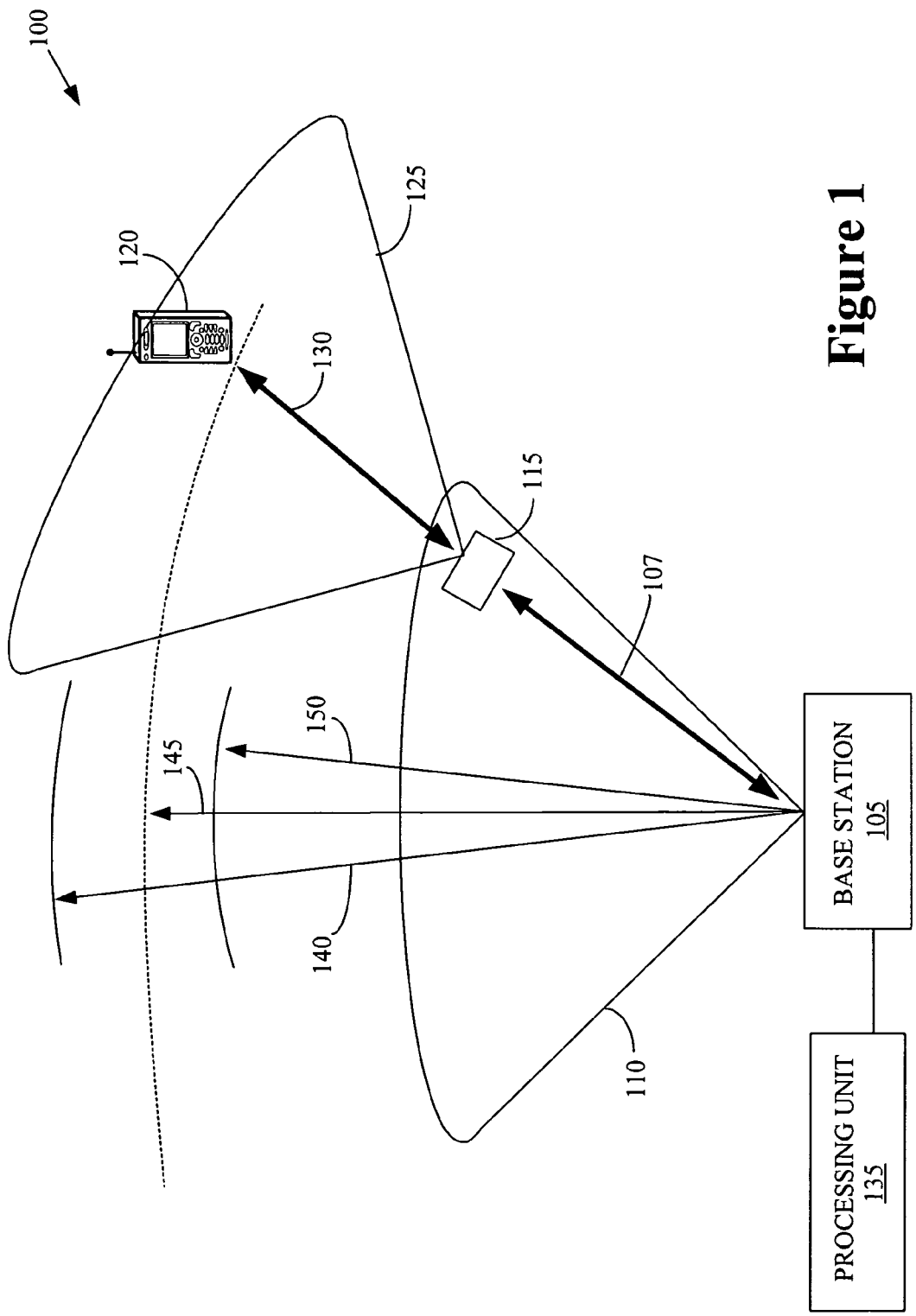
FIG. 1 conceptually illustrates a first exemplary embodiment of a wireless telecommunications system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 conceptually illustrates a first exemplary embodiment of a wireless telecommunications system 100. In the illustrated embodiment, the wireless telecommunications system 100 is assumed to be a Universal Mobile Telecommunication System (UMTS) that utilizes a Code Division Multiple Access (CDMA) protocol. However, persons of ordinary skill in the art should appreciate that the present invention is not limited to UMTS systems operating according to the CDMA protocol. In alternative embodiments, any desirable type of telecommunications system operating according to any desirable protocol may be used. For example, the wireless telecommunications system 100 may operate according to protocols such as Global System for Mobile Communications (GSM), Personal Communications Service (PCS), CDMA-2000, IS-95, Time Division Multiple Access (TDMA), Wireless Fidelity (WiFi) or other 802.11 protocols, Bluetooth, and the like. For other examples, the wireless telecommunications system 100 may utilize infrared, laser, or microwave links, as well as Ultra-wideband CDMA.

The wireless telecommunications system 100 includes at least one base station 105 for establishing one or more concurrent wireless communication links with one or more mobile units 120 (only one shown in FIG. 1). In the illustrated embodiment, the wireless communication link includes one or more radiofrequency link segments 107 (only one shown in FIG. 1) within a parent cell 110. In the illustrated embodiment, the base station 105 uses directional transmission and/or reception to form the radiofrequency link segment 107, as indicated by the pie-slice-shaped geometry of the parent cell 110. However, the present invention is not limited to directional base stations 105. In alternative embodiments, the base station 105 may transmit and/or receive signals in any desirable direction or range of directions. For example, the base station 105 may transmit and/or receive signals substantially isotropically. Moreover, as should be appreciated by persons of ordinary skill in the art, the precise shape of the parent cell 110 may also depend upon features of the environment such as mountains, buildings, the weather, and the like.

A repeater 115 is deployed within the parent cell 110. Although the repeater 115 described herein is a conventional repeater 115, the present invention is not limited to conventional repeaters 115. For example, in one alternative embodiment, the repeater 115 may be a second base station. Although only one repeater 115 is shown in FIG. 1, the present invention is not limited to the single repeater 115 in the parent cell 110. In alternative embodiments, any desirable number of repeaters 115 may be deployed within the parent cell 110. Moreover, one or more mobile units (not shown) may be deployed within the parent cell 110 and may establish concurrent wireless communication links with the base station 105.

When operating as a portion of a wireless communication link (e.g an downlink) from the base station 105 to the one or more mobile units 120 deployed in a repeater cell 125, the repeater 115 forms one or more radiofrequency link segments 130 (only one shown in FIG. 1) with the one or more mobile units 120. The repeater 115 receives one or more signals from the base station 105 on the radiofrequency link segment 107 (e.g. on a downlink channel) and provides the one or more signals to the mobile units 120 located in the repeater cell 125 on the radiofrequency link segment 130. In one embodiment, the repeater 115 amplifies the signal received from the base station 105 before providing the amplified signal to the mobile unit 120. The repeater 115 may also perform digital and/or analog signal processing on the signal received from the base station 105 before providing the signal to the mobile unit 120. For example, as discussed above, the repeater may use a digital signal processor (not shown) to process the one or more received and/or amplified signals to avoid or reduce feedback interference. As discussed above, processing by the repeater 115 may introduce a time delay between reception of the signal from the base station 105 and the subsequent transmission of the signal to the mobile unit 120.

When operating as a portion of a wireless communications link (e.g. an uplink) from the one or more mobile units 120 to the base station 105, the repeater 115 receives one or more signals from the mobile unit 120 on the radiofrequency link segment 130 (e.g. on an uplink channel) and provides the one or more signals to the base station 105 on the radiofrequency link segment 107. In one embodiment, the repeater 115 amplifies the signal received from the mobile unit 120 before providing the amplified signal to the base station 105. The repeater 115 may also perform digital and/or analog signal processing on the signal received from the mobile unit 120 before providing the signal to the base station 105. As discussed above, processing by the repeater 115 may introduce a time delay between reception of the signal from the mobile unit 120 and the subsequent transmission of the signal to the base station 105.

A processing unit 135 is coupled to the base station 105. In the embodiment depicted in FIG. 1, the processing unit 135 is shown as a separate block. For example, the processing unit 135 may be a part of a radio access network (RAN).

However, the present invention is not limited to processing units 135 that are embodied in the radio access network. In alternative embodiments, portions of the processing unit 135 may be incorporated into the base station 105, the repeater 115, and/or the mobile unit 120. The processing unit 135 may comprise a computing device running software that implements some of the operations described below. Persons of ordinary skill in the art should appreciate that the processing unit 135 may be any kind of processor known to the art operating on any kind of suitable operating system known to the art.

One or more signal propagation times are measured using the processing unit 135. In one embodiment, the processing unit 135 provides a signal to trigger the base station 105 to measure a round-trip time from the base station 105 to the mobile unit 120. Persons of ordinary skill in the art should appreciate that the present invention is not limited to measuring the round-trip time of a signal traveling from the base station 105 to the mobile unit 120 via the radiofrequency link segments 107, 130. In alternative embodiments, the processing unit 135 may provide a signal that may be used to measure a time for a signal to travel from the base station 105 to the mobile unit 120, a time for a signal to travel from the mobile unit 120 to the base station 105, a round-trip time for the signal to travel from the mobile unit 120 to the base station 105, and the like.

The processing unit 135 uses the measured time to estimate a distance 140 between the base station 105 and the mobile unit 120. For example, if no repeater 115 is present in the wireless communications link between the base station 105 and the mobile unit 120, the processing unit 135 may subtract a known delay associated with processing by the mobile unit from the measured round-trip time, multiply the corrected round-trip time by the speed of light to estimate the round-trip distance between the base station 105 and the mobile unit 120, and then divide by two to estimate the distance 140. However, as discussed above, the repeater 115 introduces a time delay between the signal received by the repeater 115 and the signal transmitted by the repeater 115. The measured round-trip time includes the time delay introduced by the repeater 115. Consequently, when the repeater 115 relays the signal from the base station 105 to the mobile unit 120, and/or from the mobile unit 120 to the base station 105, the estimated distance 140 will typically be larger than an actual distance 145 from the base station 105 to the mobile unit 120, unless the time is corrected for the delay introduced by the repeater 115.

One or more received and transmitted powers are also measured using the processing unit 135. In one embodiment, the processing unit 135 provides a signal to trigger the base station 105 to measure a power transmitted by the base station 105 and a power received by the mobile unit 120. However, persons of ordinary skill in the art should appreciate that the present invention is not limited to measuring the power transmitted by the base station 105 and the power received by the mobile unit 120. In alternative embodiments, the base station 105 may measure a power transmitted by the base station 105 and a power received by the base station 105, a power transmitted by the mobile unit 120 and a power received by the base station 105, a power transmitted by the mobile unit 120 and a power received by the mobile unit 120, and the like.

The processing unit 135 uses the measured transmitted and received powers to estimate a distance 150 from the base station 105 to the mobile unit 120. In one embodiment, the processing unit 135 compares the transmitted and received powers using a channel model associated with the radiofrequency link segments 107, 130 to account for path attenuation and/or path loss. However, as discussed above, if the signal passes through the repeater 115 and repeater 115 amplifies the signal, the received signal will be stronger than anticipated. Consequently, applying the channel model to the transmitted and received powers may cause the processing unit 135 to underestimate the distance from the station 105 to the mobile unit 120, i.e. the estimated distance 150 will be smaller than the actual distance 145.

The processing unit 135 detects the presence or absence of the repeater 115 in the wireless communication link between the base station 105 and the mobile unit 120 by comparing the estimated distance 140 and the estimated distance 150. In one embodiment in which the repeater 115 introduces a time delay and amplifies the signal, the estimated distance 140 is larger than the actual distance 145 and the estimated distance 150 is smaller than the actual distance 145. Thus, the processing unit 135 determines that the repeater 115 is present when the difference between the estimated distance 140 and the estimated distance 150 is larger than a predetermined difference. Persons of ordinary skill in the art should appreciate that the predetermined difference is a matter of design choice and may depend on such factors as the quality of the channel model, environmental conditions, and the like.

Although the repeater 115 shown in FIG. 1 introduces a time delay and amplifies the signal, this is not necessary for the practice of the present invention. In one alternative embodiment, the repeater 115 introduces a time delay but does not significantly amplify the signal. In this embodiment, the estimated distance 140 is larger than the actual distance 145 and the estimated distance 150 is approximately equal to the actual distance 145. In another alternative embodiment, the repeater 115 amplifies the signal but does not introduce a significant time delay. In this embodiment, the estimated distance 140 is approximately equal to the actual distance 145 and the estimated distance 150 is smaller than the actual distance 145. In both alternative embodiments, the processing unit 135 may still determine that the repeater 115 is present when the difference between the estimated distance 140 and the estimated distance 150 is larger than a predetermined difference.

In one embodiment, the processing unit 135 determines the actual distance 145 based upon the estimated distances 140, 150. For example, if the difference between the estimated distances 140, 150 is larger than the predetermined difference, and the processing unit 135 detects the presence of the repeater 115, the processing unit 135 recalculates the estimated distances 140, 150 using known time delay and/or amplification characteristics of the repeater 115. If a difference between the recalculated distances 140, 150 is smaller than the predetermined difference, then the processing unit 135 determines that the actual distance 145 is approximately equal to one of the estimated distances 140, 150 or a combination, such as an average, of the estimated distances 140, 150. If the difference between the recalculated distances 140, 150 is larger than the predetermined difference, then the processing unit 135 may determine that an error condition exists. Alternatively, as discussed below, the processing unit 135 may determine that more than one repeater 115 is present.

In one embodiment, the time delay and/or the amplification factor introduced by the repeater 115 is predetermined and provided to the processing unit 135. However, the present invention is not limited to predetermined time delay and/or amplification factors. In alternative embodiments, a position of the mobile unit 120 may be determined using a positioning system such as a global navigation satellite system (GNSS). For example, a global positioning system (GPS) may be used to determine the position of the mobile unit 120. The processing unit 135 may then determine the time delay and/or the amplification factor introduced by the repeater 115 using the determined position of the mobile unit 120.

Figure 2:
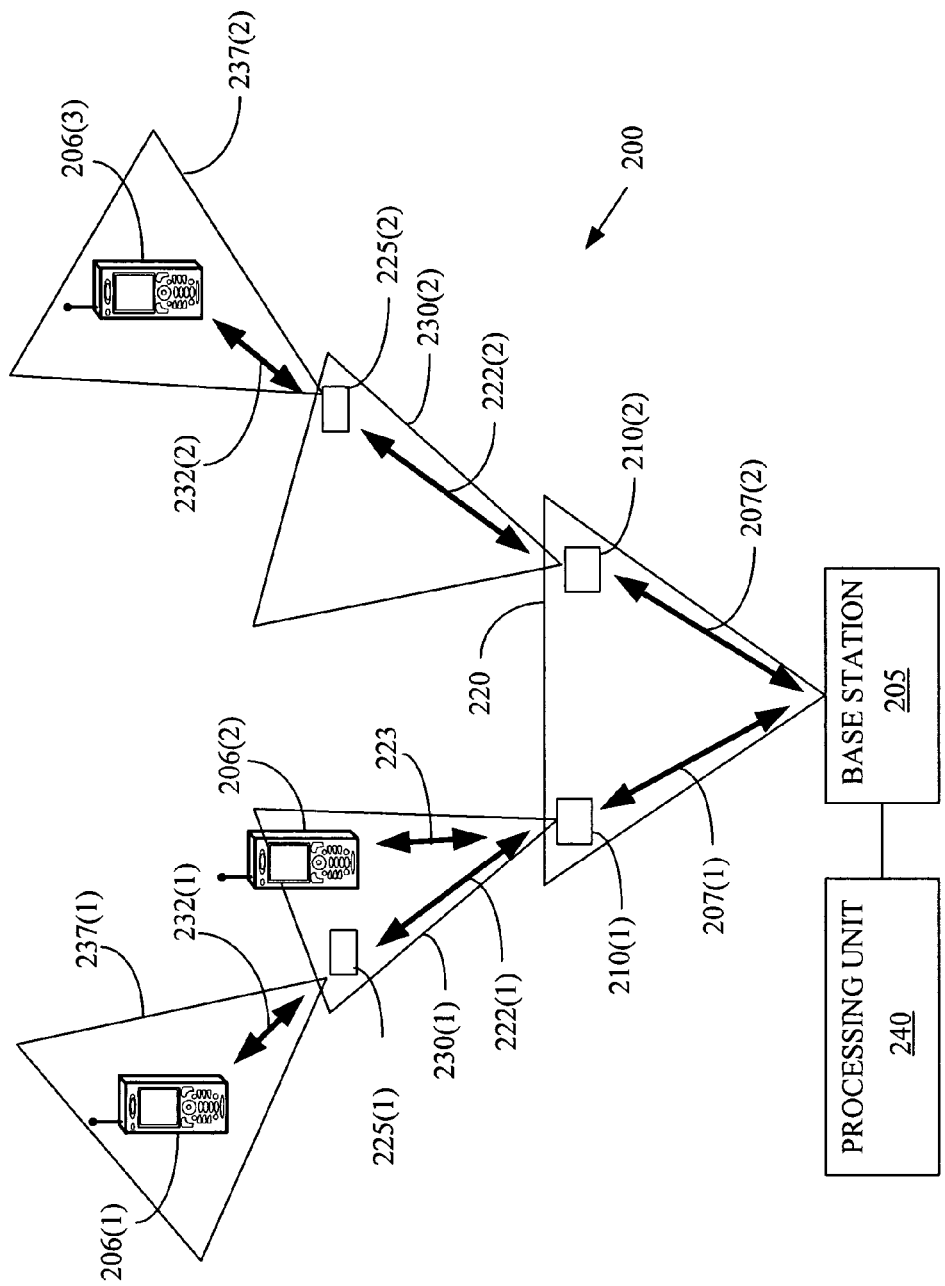
FIG. 2 conceptually illustrates a second exemplary embodiment of a wireless telecommunications system, in accordance with the present invention.

FIG. 2 conceptually illustrates a second exemplary embodiment of a wireless communications system 200. In the illustrated embodiment, a base station 205 establishes one or more concurrent wireless communication links with one or more mobile units 206(1–3). In the illustrated embodiment, the concurrent wireless communication links include radiofrequency link segments 207(1–2) from the base station 205 to repeaters 210(1–2) deployed in the parent cell 220. The concurrent wireless communication links also include one or more radiofrequency link segments 222(1–2), 223 between the repeaters 210(1–2) and repeaters 225(1–2) and/or the mobile units 206(2) in cells 230(1–2). The concurrent wireless communication links between the base station 205 and the mobile units 206(1) and 206(3) also include radiofrequency link segments 232(1–2) between the repeaters 225(1–2) and the mobile units 206(1) and 206(3). Persons of ordinary skill in the art should appreciate that additional repeaters and associated cells may be used to extend the wireless communications system 200 as desired.

A processing unit 240 detects the presence or absence of the repeaters 210(1–2), 225(1–2) in the wireless communication link between the base station 205 and the mobile units 206(1–3) by comparing distances estimated using the aforementioned time-delay and channel modeling techniques. For example, the processing unit 240 may detect the presence of the repeater 210(1) in the wireless communications link between the base station 205 and the mobile unit 206(2) when a difference between the distances estimated using the aforementioned time-delay and channel modeling techniques is larger than a first predetermined difference. For another example, the processing unit 240 may detect the presence of the repeaters 210(1–2), 225(1–2) in the wireless communications link between the base station 205 and the mobile units 206(1) and/or 206(3) when a difference between the distances estimated using the aforementioned time-delay and channel modeling techniques is larger than a second predetermined difference. In the illustrated embodiment, the second predetermined difference is larger than the first predetermined difference. As discussed above, the processing unit 240 may also determine the actual distance between the base station 205 and the mobile units 206(1–3).

Those skilled in the art will appreciate that the various system layers, routines, or modules illustrated in the various embodiments herein may be executable control and/or processing units. The control and/or processing units may include a microprocessor, a microcontroller, a digital signal processor, a processor card (including one or more microprocessors or controllers), or other control, computing, or processing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for detecting at least one repeater between a base station and a mobile unit, comprising:
   determining a first estimate of a distance traveled by a signal on a wireless communication link between the base station and the mobile unit;
   determining a second estimate of the distance traveled by the signal on the wireless communication link between the base station and the mobile unit;
   comparing the first and second estimates; and
   determining whether the signal was processed by the at least one repeater based upon comparing the first and second estimates.

2. The method of claim 1, wherein determining the first estimate comprises determining at least one of a round-trip time associated with the signal, a time for the signal to travel from the base station to the mobile unit, and a time for the signal to travel from the mobile unit to the base station.

3. The method of claim 2, wherein determining the first estimate comprises determining the first estimate based upon at least one of the round-trip time associated with the signal, the time for the signal to travel from the base station to the mobile unit, and the time for the signal to travel from the mobile unit to the base station.

4. The method of claim 1, wherein determining the second estimate comprises receiving a quantity indicative of a transmitted power and a quantity indicative of a received power.

5. The method of claim 4, wherein receiving the quantity indicative of the transmitted power comprises receiving the quantity indicative of at least one of a power transmitted by the base station and a power transmitted by the mobile unit.

6. The method of claim 4, where in receiving the quantity indicative of the received power comprises receiving a quantity indicative of at least one of a power received by the base station and a power received by the mobile unit.

7. The method of claim 4, wherein determining the second estimate comprises determining the second estimate based upon the transmitted power, the received power, and a channel model.

8. The method of claim 1, wherein comparing the first and second estimates comprises determining whether a difference between the first and second estimates is larger than a first predetermined difference.

9. The method of claim 8, wherein determining whether the signal was processed by at least one repeater comprises determining that the signal was processed by at least one repeater when the difference between first and second estimates is larger than the first predetermined difference.

10. The method of claim 1, comprising determining the distance traveled by the signal on the wireless communication link between the base station and the mobile unit.

11. The method of claim 10, wherein determining the distance traveled by the signal comprises determining the distance traveled by the signal based on at least one time delay associated with the at least one repeater and at least one channel model associated with the wireless communication link.

12. The method of claim 1, comprising:
determining a position of the mobile unit; and
determining at least one of a time delay and an amplification factor associated with the repeater based upon the determined position.

13. The method of claim 1, comprising determining whether the signal was processed by a plurality of repeaters based upon comparing the first and second estimates.

14. An apparatus for detecting at least one repeater between a base station and a mobile unit, comprising:
a processing unit configured to:
determine a first estimate of a distance traveled by a signal on a wireless communication link between the base station and the mobile unit;
determine a second estimate of the distance traveled by the signal on the wireless communication link between the base station and the mobile unit;
compare the first and second estimates; and
determine whether the signal was processed by the at least one repeater based upon comparing the first and second estimates.

15. The apparatus of claim 14, wherein the processing unit is configured to:
determine at least one of a round-trip time associated with the signal, a time for the signal to travel from the base station to the mobile unit, and a time for the signal to travel from the mobile unit to the base station; and
determine the first estimate based upon at least one of at least one of the round-trip time associated with the signal, the time for the signal to travel from the base station to the mobile unit, and the time for the signal to travel from the mobile unit to the base station.

16. The apparatus of claim 14, wherein the processing unit is configured to:
receive a quantity indicative of at least one of a power transmitted by the base station and a power transmitted by the mobile unit;
receive a quantity indicative of at least one of a power received by the base station and a power received by the mobile unit; and
determine the second estimate based upon at least one of the power transmitted by the base station and the power transmitted by the mobile unit, at least one of the power received by the base station and the power received by the mobile unit, and a channel model.

17. The apparatus of claim 14, wherein the processing unit is configured to determine that the signal was processed by at least one repeater when a difference between the first and second estimates is larger that a predetermined difference.

18. The apparatus of claim 14, wherein the processing unit is configured to determine the distance traveled by the signal on the wireless communication link between the base station and the mobile unit.

19. The apparatus of claim 14, wherein the processing unit is configured to:
determine a position of the mobile unit; and
determine at least one of a time delay and an amplification factor associated with the repeater based upon the determined position.

20. The apparatus of claim 14, wherein the processing unit is configured to determine whether the signal was processed by a plurality of repeaters based upon comparing the first and second estimates.

* * * * *